United States Patent
Ihara et al.

(10) Patent No.: US 10,774,009 B2
(45) Date of Patent: Sep. 15, 2020

(54) INERT GAS SUBSTITUTING METHOD AND CERAMIC STRUCTURE MANUFACTURING METHOD USING INERT GAS SUBSTITUTING METHOD

(71) Applicant: NGK INSULATORS, LTD., Nagoya (JP)

(72) Inventors: Chikashi Ihara, Nagoya (JP); Takashi Goshima, Nagoya (JP); Yoshiyuki Kamei, Nagoya (JP)

(73) Assignee: NGK Insulatros, Ltd., Nagoya (JP)

( * ) Notice: Subject to any disclaimer, the term of this patent is extended or adjusted under 35 U.S.C. 154(b) by 239 days.

(21) Appl. No.: 15/969,052

(22) Filed: May 2, 2018

(65) Prior Publication Data
US 2018/0244584 A1 Aug. 30, 2018

Related U.S. Application Data

(63) Continuation of application No. PCT/JP2016/084943, filed on Nov. 25, 2016.

(30) Foreign Application Priority Data

Nov. 25, 2015 (JP) .................... 2015-229499

(51) Int. Cl.
C04B 38/00 (2006.01)
F27D 7/06 (2006.01)
(Continued)

(52) U.S. Cl.
CPC ........ *C04B 38/0006* (2013.01); *C04B 35/565* (2013.01); *C04B 35/64* (2013.01);
(Continued)

(58) Field of Classification Search
CPC ........ C04B 38/0006; C04B 2235/6584; C04B 2235/6581; F27D 7/06; F27D 9/06
(Continued)

(56) References Cited

U.S. PATENT DOCUMENTS 8,741,800 B2 * 6/2014 Elam ............... B01J 21/063
502/216
2002/0153073 A1 10/2002 Hattori et al.
(Continued)

FOREIGN PATENT DOCUMENTS

JP S60-065766 A1 4/1985
JP 2002-256306 A1 9/2002
(Continued)

OTHER PUBLICATIONS

International Search Report and Written Opinion (Application No. PCT/JP2016/084943) dated Dec. 20, 2016.

*Primary Examiner* — Erin Snelting
(74) *Attorney, Agent, or Firm* — Burr & Brown, PLLC

(57) ABSTRACT

An inert gas substituting method includes: a closing step of accommodating a honeycomb formed body in an indoor space of a gas substituting chamber and closing the same with airtightness from the outside being maintained; a pressure reducing step of reducing the pressure in the indoor space to a preset first vacuum pressure; a pressure increasing step of introducing argon gas into the pressure-reduced indoor space and increasing the pressure to a second vacuum pressure which is higher than the first vacuum pressure and lower than atmospheric pressure; a pressure re-reducing step of reducing the pressure to the first vacuum pressure again; and a pressure recovering step of repeating the pressure increasing step and the pressure re-reducing step at least twice, introducing argon gas into the indoor space in which the pressure has been reduced to the first vacuum pressure again, and recovering the pressure to atmospheric pressure.

15 Claims, 7 Drawing Sheets

(51) Int. Cl.
 *C04B 35/64* (2006.01)
 *C04B 35/565* (2006.01)
 *F27B 9/04* (2006.01)
 *C04B 111/00* (2006.01)

(52) U.S. Cl.
 CPC .................. *F27B 9/04* (2013.01); *F27D 7/06* (2013.01); *C04B 2111/00793* (2013.01); *C04B 2235/6581* (2013.01); *C04B 2235/6584* (2013.01)

(58) Field of Classification Search
 USPC .................................................... 427/255.11
 See application file for complete search history.

(56) References Cited

U.S. PATENT DOCUMENTS

| | | | | |
|---|---|---|---|---|
| 2014/0072710 | A1* | 3/2014 | Valle | C04B 35/573 |
| | | | | 427/248.1 |
| 2016/0060173 | A1* | 3/2016 | Binhussain | C04B 35/115 |
| | | | | 423/625 |
| 2016/0060179 | A1* | 3/2016 | Binhussain | C04B 35/111 |
| | | | | 428/220 |
| 2016/0370116 | A1* | 12/2016 | Rogers | F27D 7/06 |

FOREIGN PATENT DOCUMENTS

| | | | |
|---|---|---|---|
| JP | 2002-318081 | A1 | 10/2002 |
| JP | 2007-238409 | A1 | 9/2007 |

\* cited by examiner

*: CALCURATED ON ASSUMPTION THAT AMOUNT OF ARGON GAS USED IN COMPARATIVE EXAMPLE 1 IS 100%

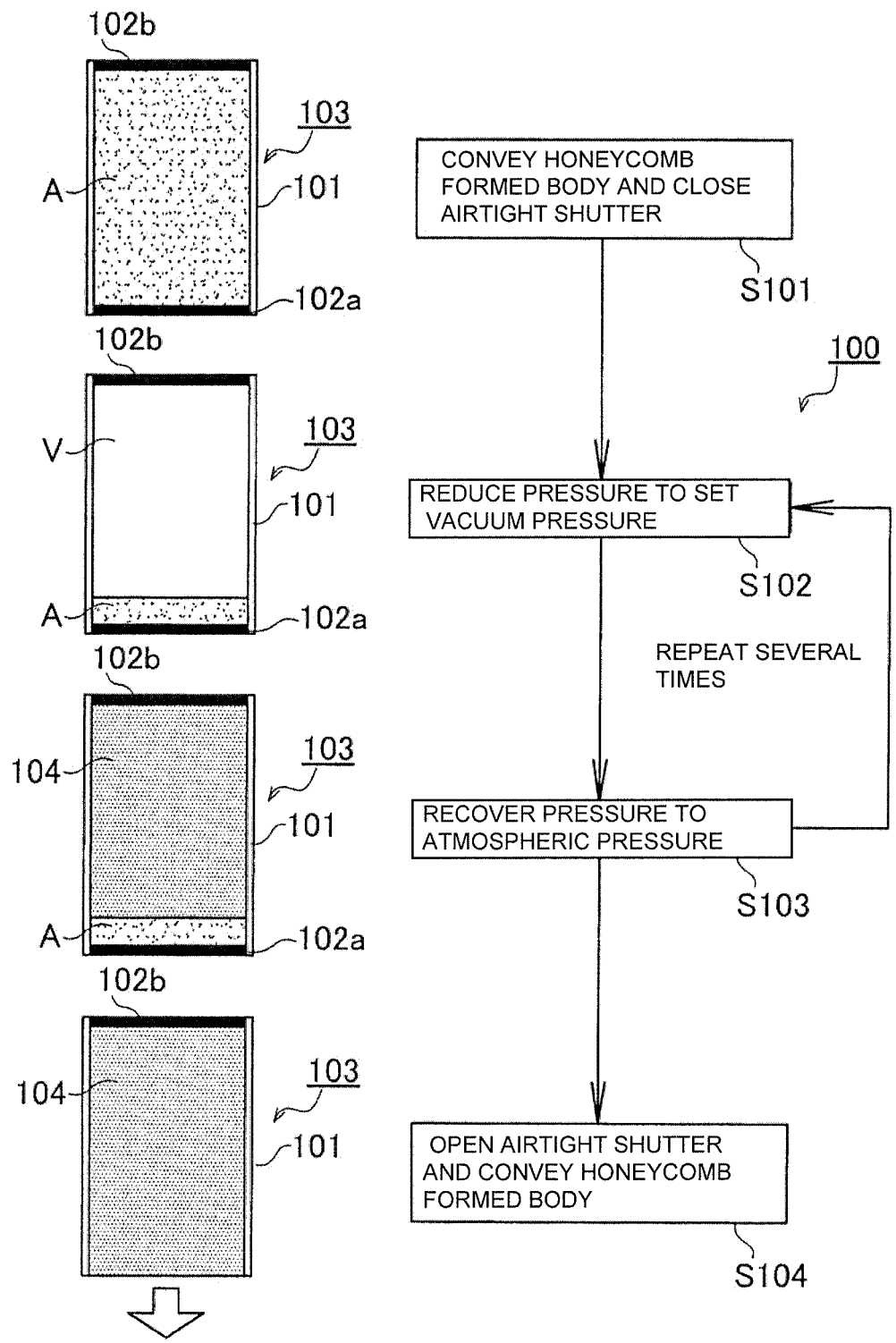

INERT GAS SUBSTITUTING METHOD AND CERAMIC STRUCTURE MANUFACTURING METHOD USING INERT GAS SUBSTITUTING METHOD

TECHNICAL FIELD

The present invention relates to an inert gas substituting method and a ceramic structure manufacturing method using the inert gas substituting method. More specifically, the present invention relates to an inert gas substituting method, which is performed in a firing step for manufacturing a ceramic structure such as a honeycomb structure and substitutes a closed space isolated from the outside with inert gas such as argon gas or nitrogen gas, and a ceramic structure manufacturing method using the inert gas substituting method (hereinafter simply referred to as a "ceramic structure manufacturing method").

BACKGROUND ART

Conventionally, a ceramic honeycomb structure or the like, which is a type of ceramic structure, is used for a wide range of applications, such as a catalyst carrier for automobile exhaust gas purification, a diesel particulate removal filter, or a heat storage body for a combustion device. A ceramic honeycomb structure (hereinafter simply referred to as a "honeycomb structure") is manufactured by preparing a molding raw material (kneaded clay), extruding the kneaded clay into a desired honeycomb shape using an extruder, followed by raw cutting, drying and finish cutting, and then subjecting the material through a firing step of firing a honeycomb formed body at a high temperature.

In the honeycomb structure manufacturing method, the firing step of the honeycomb formed body can be largely divided into two main steps. For example, the firing step of the honeycomb formed body includes a debinder step of heating and removing organic matters, carbides, or the like included in the honeycomb formed body and a main firing step of sintering the debinded honeycomb formed body by heating the debinded honeycomb formed body at a high temperature.

There are two types of honeycomb structures. One is a honeycomb structure using oxide ceramic as a raw material, and the other is a honeycomb structure using non-oxide ceramic as a raw material. Although oxide ceramic can be main-fired in an air atmosphere, non-oxide ceramic needs to be main-fired in inert gas such as a non-oxidizing atmosphere such as argon gas. The present invention relates to the firing of a honeycomb structure made of non-oxide ceramic in particular.

In the main firing step, there are the case of using a continuous firing furnace and the case of using a single firing furnace. In particular, the continuous firing furnace is suitable for mass production of a honeycomb structure. In the case of using the continuous firing furnace as described above, a gas substituting chamber having a pair of airtight shutters capable of shutting off between a main firing furnace and the outside while maintaining airtightness is provided on the upstream side and the downstream side of the main firing furnace so as to perform the main firing step under inert gas. Therefore, before the honeycomb formed body is introduced into the main firing furnace and before the honeycomb fired body is taken out from the main firing furnace, it is possible to substitute an indoor space (closed space) of the gas substituting chamber with inert gas and it is possible to prevent the atmospheric air from entering a furnace space of the main firing furnace. As a result, in the furnace space of the main firing furnace, it is possible to perform the main firing step stably in the absence of oxygen. In the case of the single firing furnace (firing kiln) which does not include the gas substituting chamber, inert gas substitution is performed using a furnace space of the single firing furnace as a closed space before and after the main firing by high temperature heating.

An example of a conventional inert gas substituting method 100 will be mainly described with reference to FIG. 7. Here, an example of substituting the inert gas by a gas substituting chamber 101 installed on the upstream side of a main firing furnace (not illustrated) will be described in particular. The left side of FIG. 7 illustrates the gas substituting chamber 101 connected to the main firing furnace. A furnace-side airtight shutter 102a provided between the gas substituting chamber 101 and the furnace space of the main firing furnace is closed in advance, and airtightness between the furnace space and an indoor space 103 (corresponding to the closed space) of the gas substituting chamber 101 is maintained. Therefore, the flow of gas between the furnace space and the indoor space 103 is restricted. In this state, a honeycomb formed body is conveyed to the indoor space 103 from an inlet through which a one-side (outer-side) airtight shutter 102b is opened. In FIG. 7, the conveyed honeycomb formed body is not illustrated.

After the conveyance of the honeycomb formed body to the indoor space 103 is completed, the outer-side airtight shutter 102b is closed and the indoor space 103 of the gas substituting chamber 101 is closed by the pair of airtight shutters 102a and 102b (closing step S101). At this time, the indoor space 103 is filled with the atmosphere A, and the atmosphere A does not leak into the furnace space or the outside of the main firing furnace.

Next, the pressure in the indoor space 103 is reduced to a preset vacuum pressure by using a pressure reducing means (not illustrated) such as a vacuum pump, and a vacuum state is maintained (pressure reducing step S102). The set vacuum pressure is, for example, a pressure of about 5% with respect to the atmospheric pressure. Therefore, most of the indoor space 103 is a vacuum region V, and the atmosphere A slightly remains. FIG. 7 illustrates that the vacuum region V and the atmosphere A are separated and present in the indoor space 103, but this is for simplifying the illustration. In actuality, the vacuum region V and the atmosphere A are mixed and present therein (the same applies below).

After that, the operation of the pressure reducing means is stopped and inert gas 104 (argon gas or the like) is introduced into the indoor space 103 (pressure recovering step S103). At this time, the introduction of the inert gas 104 recovers pressure until the indoor space 103 has the same pressure as the atmospheric pressure, that is, up to 100% with respect to the atmospheric pressure. After that, the pressure reduction of the indoor space 103 (pressure reducing step S102) and the pressure recovery to the atmospheric pressure (pressure recovering step S103) are repeated several times, then the furnace-side airtight shutter 102a is opened, and the furnace space of the main firing furnace and the indoor space 103 are made to communicate with each other, and the honeycomb formed body is conveyed to the furnace space (conveying step S104).

As a result, it is possible to convey the honeycomb formed body while avoiding penetration of oxygen, nitrogen, or the like of the atmosphere into the furnace space of the firing furnace set in advance under inert gas. In particular, it is possible to avoid occurrence of problems such as influence on the firing of the honeycomb formed body due to penetration of oxygen having a specified oxygen concentration or more into the furnace space.

Even in the gas substituting chamber installed on the downstream side of the main firing furnace, the inert gas substituting method similar to the above is performed so as to prevent oxygen or the like from penetrating into the furnace space when the honeycomb fired body after the firing is taken out. In addition, even in the case of the single firing furnace not using the gas substituting chamber, the opening and closing between the furnace space (closed space) and the outside is performed by the airtight shutter provided at a furnace open end of the single firing furnace, the furnace space can be substituted with inert gas or the like by repeating the pressure reduction and the pressure recovery in the furnace space as in the gas substituting chamber. The firing is performed in the inert gas, and the furnace space after cooling in the furnace is substituted with the atmosphere.

A process of introducing inert gas or the like into a purge chamber (corresponding to a gas substituting chamber) after pressure reduction and recovering the internal pressures of the purge chamber and a heating chamber (corresponding to a main firing furnace) so as to be substantially equal to each other is disclosed in, for example, Patent Document 1.

CITATION LIST

Patent Documents

[Patent Document 1] JP-A-2002-318081

SUMMARY OF THE INVENTION

Problem to be Solved by the Invention

However, the conventional inert gas substituting method has a possibility of causing problems in the points listed below. That is, inert gas such as argon gas, nitrogen gas, or other rare gas is generally used as the inert gas for substituting the atmosphere in the indoor space (closed space) of the gas substituting chamber. For example, argon gas is present at 0.93% of the atmosphere, and argon gas is liquefied by cooling the atmosphere at extremely low temperature, and oxygen, nitrogen, and other gas components are fractionated to produce high-purity argon gas through separation and purification.

For this reason, the separation and purification of the argon gas requires a lot of mechanical equipment and energy for cooling and requires a great deal of cost. Therefore, the argon gas itself is expensive, and the repeating of the step of recovering the pressure to the atmospheric pressure after the pressure reduction in the main firing step consumes a large amount of argon gas, and there is a problem that the manufacturing cost of the honeycomb structure increases.

Therefore, a method for reducing an amount of argon gas to be substituted has been studied. For example, it is assumed that a high-performance vacuum pump capable of reducing a pressure to a high vacuum pressure is used, argon gas is introduced from a reduced pressure state of the high vacuum pressure to the same level as the atmospheric pressure, and the number of times of pressure recoveries is reduced. This makes it possible to significantly reduce the amount of argon gas used.

On the other hand, dust generated during the firing of the honeycomb formed body often scatters and stays in a main firing furnace and a gas substituting chamber. Therefore, when the pressure is reduced by using a vacuum pump, the dust is suctioned and it is necessary to install a filter in front of the vacuum pump so as to protect the vacuum pump from the dust. Since the high-performance vacuum pump necessary for reducing the pressure to a high vacuum pressure is vulnerable to dust contamination, the installation of a high-performance filter and the frequent filter exchange are required. Thus, maintenance and management takes time and the efficiency of the process decreases. Therefore, the method for substituting inert gas such as argon gas, which does not require a pressure reduction to a high vacuum pressure and can reduce the amount of inert gas used, has been expected in the honeycomb structure manufacturing method.

Therefore, the present invention has been made in view of the above-described circumstances, and provides an inert gas substituting method, which is capable of reducing an amount of inert gas used when the substitution of inert gas is performed in a firing step (main firing step), suppressing a manufacturing cost of a ceramic structure such as a honeycomb structure, and realizing the above effects by using an existing facility, and a ceramic structure manufacturing method using the inert gas substituting method.

Means for Solving the Problem

According to the inert gas substituting method and the ceramic structure manufacturing method of the present invention, an inert gas substituting method and a ceramic structure manufacturing method, which solve the above problems, are provided.

[1] An inert gas substituting method including: a closing step of accommodating a ceramic body in a closed space and closing the closed space with airtightness from the outside being maintained; a pressure reducing step of reducing a pressure in the closed space to a preset first vacuum pressure; a pressure increasing step of introducing inert gas into the pressure-reduced closed space and increasing the pressure in the closed space to a second vacuum pressure which is higher than the first vacuum pressure and lower than atmospheric pressure; a pressure re-reducing step of reducing the pressure in the pressure-increased closed space to the first vacuum pressure again; and a pressure recovering step of repeating the pressure increasing step and the pressure re-reducing step at least twice, introducing the inert gas into the closed space in which the pressure has been reduced to the first vacuum pressure again, and recovering the pressure in the closed space to atmospheric pressure.

[2] The inert gas substituting method according to [1], wherein the pressure increasing step and the pressure re-reducing step are repeated four times.

[3] The inert gas substituting method according to [1] or [2], wherein the closed space is an indoor space of a gas substituting chamber connected to a furnace open end of at least one of an upstream side and a downstream side of a firing furnace which fires the ceramic body, and an airtight shutter capable of closing the closed space and the furnace space of the firing furnace while maintaining airtightness is installed between the gas substituting chamber and the furnace open end of the firing furnace.

[4] The inert gas substituting method according to [1] or [2], wherein the closed space is a furnace space of a firing furnace which fires the ceramic body, and an airtight shutter is installed in a furnace open end of the firing furnace.

[5] The inert gas substituting method according to any one of [1] to [4], wherein the second vacuum pressure is adjusted so that the second vacuum pressure becomes constant in each of the pressure increasing steps repeated at least twice, or the second vacuum pressure is adjusted so that the second vacuum pressure is high whenever the pressure increasing step is performed.

[6] The inert gas substituting method according to any one of [1] to [5], wherein argon gas is used as the inert gas.

[7] The inert gas substituting method according to any one of [1] to [6], wherein the ceramic body is a honeycomb formed body having a lattice-shaped partition wall which partitions and forms a plurality of cells extending from one end surface to the other end surface and a circumferential wall.

[8] The inert gas substituting method according to any one of [1] to [7], wherein an oxygen concentration in the closed space recovered to the atmospheric pressure by the pressure recovering step is 500 ppm or less.

[9] The inert gas substituting method according to any one of [1] to [8], wherein the first vacuum pressure is adjusted to the range of 0.1 to 5 kPa, and the second vacuum pressure is adjusted to the range of 12 to 50 kPa.

[10] The inert gas substituting method according to any one of [1] to [9], wherein a pressure increase due to leakage in the closed space is 1.0 Pa or less in 1 second.

[11] A ceramic structure manufacturing method using an inert gas substituting method, including: a molding step of forming a ceramic body from a molding material; and a firing step of firing the ceramic body obtained by the molding step to form a ceramic structure; wherein the firing step comprises: a closing step of accommodating the ceramic body in a closed space and closing the closed space with airtightness from the outside being maintained; a pressure reducing step of reducing a pressure in the closed space to a preset first vacuum pressure; a pressure increasing step of introducing inert gas into the pressure-reduced closed space and increasing the pressure in the closed space to a second vacuum pressure which is higher than the first vacuum pressure and lower than atmospheric pressure; a pressure re-reducing step of reducing the pressure in the pressure-increased closed space to the first vacuum pressure again; and a pressure recovering step of repeating the pressure increasing step and the pressure re-reducing step at least twice, introducing the inert gas into the closed space in which the pressure has been reduced to the first vacuum pressure again, and recovering the pressure in the closed space to atmospheric pressure.

[12] The ceramic structure manufacturing method using the inert gas substituting method according to [11], wherein the inert gas substituting method in the firing step repeats the pressure increasing step and the pressure re-reducing step four times.

[13] The ceramic structure manufacturing method using the inert gas substituting method according to [11] or [12], wherein the inert gas substituting method in the firing step adjusts the second vacuum pressure so that the second vacuum pressure becomes constant in each of the pressure increasing steps repeated at least twice, or adjusts the second vacuum pressure so that the second vacuum pressure is high whenever the pressure increasing step is performed.

[14] The ceramic structure manufacturing method using the inert gas substituting method according to any one of [11] to [13], wherein the ceramic body is a honeycomb formed body having a lattice-shaped partition wall which partitions and forms a plurality of cells extending from one end surface to the other end surface and a circumferential wall.

[15] The ceramic structure manufacturing method using the inert gas substituting method according to [14], wherein the ceramic body comprises silicon carbide as a main component.

Effect of the Invention

According to an inert gas substituting method of the present invention, it is possible to reduce an amount of inert gas used by using an existing facility and to suppress a manufacturing cost of a ceramic structure such as a honeycomb structure. Furthermore, according to a ceramic structure manufacturing method of the present invention, it is possible to manufacture a ceramic structure by using the inert gas substituting method in a firing step, while suppressing a manufacturing cost thereof.

BRIEF DESCRIPTION OF THE DRAWINGS

FIG. 7 is an explanatory view schematically illustrating a flow of a process by a conventional inert gas substituting method.

MODE FOR CARRYING OUT THE INVENTION

Hereinafter, embodiments of an inert gas substituting method and a ceramic structure manufacturing method of the present invention will be described in detail with reference to the drawings. The inert gas substituting method and the ceramic structure manufacturing method of the present invention are not particularly limited to the following embodiments, and various design changes, modifications, improvements, and the like can be added thereto without departing from the scope of the present invention.

(1) Configuration of Main Firing Furnace and Gas Substituting Chamber

Figure 1:
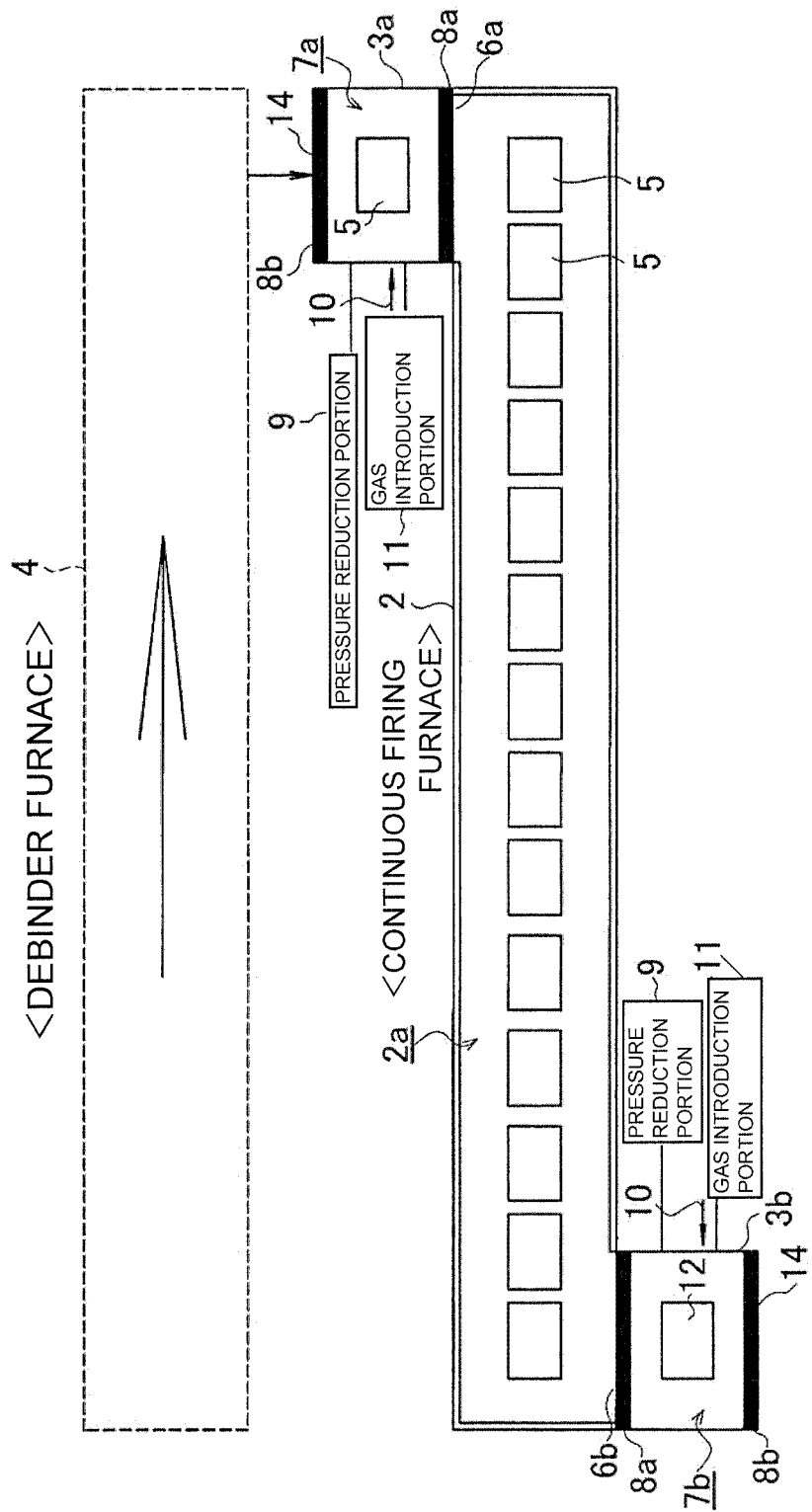
FIG. 1 is an explanatory view schematically illustrating a configuration of a main firing furnace and a gas substituting chamber.
Figure 2:
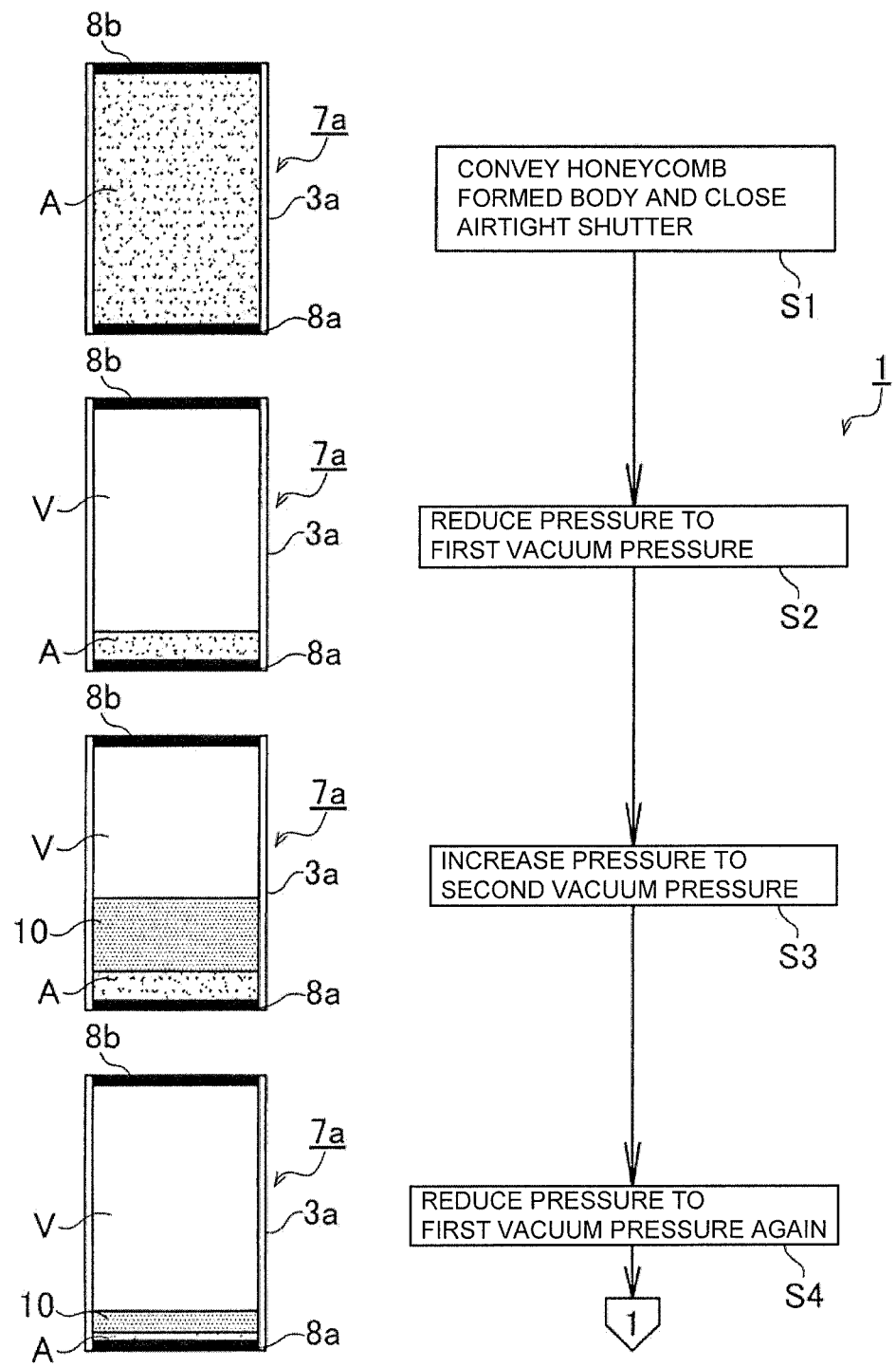
FIG. 2 is an explanatory view schematically illustrating a flow of a process by an inert gas substituting method of the present embodiment.
Figure 3:
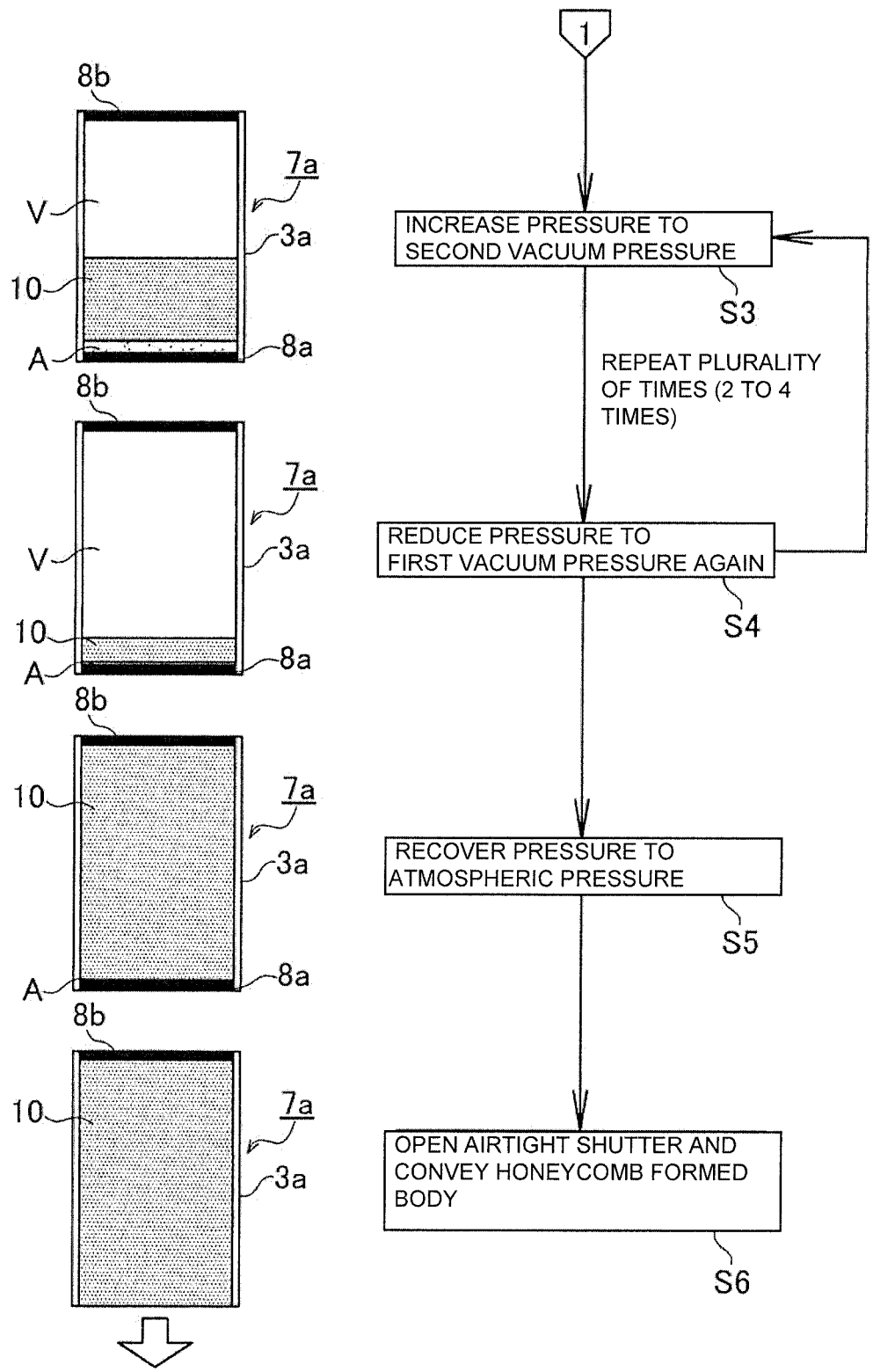
FIG. 3 is an explanatory view schematically illustrating a flow of a process by an inert gas substituting method of the present embodiment.

An inert gas substituting method 1 of an embodiment of the present invention (hereinafter simply referred to as a "substituting method 1", see FIGS. 2 and 3) is performed in a firing step of firing a honeycomb formed body (corresponding to a ceramic body in the present invention) for manufacturing a honeycomb structure as a ceramic structure. Here, the honeycomb formed body has a lattice-shaped partition wall and a circumferential wall, which are formed by a molding step of extruding a previously prepared molding material and partition and form a plurality of cells extending from one end surface to the other end surface. That is, the substituting method 1 of the present embodiment is performed in a firing step which is one step of firing the honeycomb formed body in a ceramic structure manufacturing method according to the present invention, and constitutes a part of the ceramic structure (honeycomb structure) manufacturing method. In the case of a continuous firing furnace, as illustrated in FIG. 1, the firing step is largely divided into a debinder step and a main firing step. An example in which the substituting method 1 of the present embodiment is performed in a pair of gas substituting chambers 3a and 3b provided on the upstream side and the downstream side of the main firing furnace 2 in which the main firing step is performed is exemplified.

The main firing furnace 2 fires a honeycomb formed body 5 (corresponding to a ceramic body), which is sent from a debinder furnace 4 of a debinder step which is a step prior to the main firing step and from which grease, organic matter, or the like has been removed, at a high temperature in an inert gas atmosphere. The main firing furnace 2 has an elongated shape and can perform the main firing until reaching the other furnace open end 6b while moving the honeycomb formed body 5 introduced into the furnace space 2a from one furnace open end 6a at a constant speed along a horizontal direction.

The gas substituting chambers 3a and 3b are provided so as to be connected to the pair of furnace open ends 6a and 6b of the main firing furnace 2. Each of the gas substituting chambers 3a and 3b includes furnace-side airtight shutters 8a and outer-side airtight shutters 8b. The furnace-side airtight shutter 8a can open and close while maintaining airtightness between the furnace space 2a of the main firing furnace 2 and the indoor spaces 7a and 7b (closed spaces) of the respective gas substituting chambers 3a and 3b. The outer-side airtight shutters 8b can open and close while maintaining airtightness between the outside of the gas substituting chambers 3a and 3b and the indoor spaces 7a and 7b. By closing the pair of airtight shutters 8a and 8b, the flow of gas between the furnace space 2a of the main firing furnace 2 and the outside can be shut off and brought into a closed state.

Furthermore, each of the gas substituting chambers 3a and 3b includes a pressure reduction portion 9 such as a vacuum pump for reducing the pressure in the indoor spaces 7a and 7b until reaching a preset vacuum pressure, and a gas introduction portion 11 for introducing argon gas 10 into the pressure-reduced indoor spaces 7a and 7b. Here, the argon gas 10 corresponds to the inert gas of the present invention. As the pressure reduction portion 9 and the gas introduction portion 11, the equipment used in the existing inert gas substituting method can be used as it is, and a detailed description thereof will be omitted. Furthermore, a control unit (not illustrated) equipped with a control program for controlling the timing and time of the pressure reduction by the pressure reduction portion 9 and the introduction amount and introduction timing of the argon gas 10 by the gas introduction portion 11 is electrically connected to each of the pressure reduction portion 9 and the gas introduction portion 11.

(2) Honeycomb Formed Body

In the substituting method 1 of the present embodiment, the honeycomb formed body 5 to be introduced into the gas substituting chamber 3a includes a lattice-shaped partition wall which partitions and forms a plurality of cells extending from one end surface to the other end surface and a circumferential wall, and is made of non-oxide ceramic mainly including silicon carbide having a substantially round pillar shape. As illustrated in FIG. 1, the honeycomb formed bodies 5 loaded on a firing setter (not illustrated) are respectively introduced into the gas substituting chamber 3a. Furthermore, a honeycomb structure 12 loaded on the firing setter, which is fired by the main firing furnace 2, is taken out from the main firing furnace 2 through the gas substituting chamber 3b.

(3) Substitution of Argon Gas

Next, an example of the substituting step of the argon gas 10 according to the substituting method 1 of the present embodiment using the main firing furnace 2 and the gas substituting chambers 3a and 3b will be mainly described with reference to FIGS. 2 and 3. Here, in the substituting method 1 of the present embodiment, the step before the introduction of the honeycomb formed body 5 into the main firing furnace 2, that is, the flow of the substituting step in the gas substituting chamber 3a provided on the upstream side of the main firing furnace 2 will be described in particular. In addition, as an initial state, the furnace-side airtight shutter 8a provided between the furnace open end 6a and the gas substituting chamber 3a on the upstream side of the main firing furnace 2 is closed in advance.

In this state, the pair of honeycomb formed bodies 5 after the completion of the debinder step is conveyed to the indoor space 7a of the gas substituting chamber 3a through the gas substituting chamber open end 14 of the gas substituting chamber 3a with the outer-side airtight shutter 8b opened. In FIGS. 2 and 3, in order to clarify the state of the argon gas 10 or the like in the indoor space 7a, the conveyed honeycomb formed body 5 is not illustrated.

After the conveyance of the honeycomb formed body 5, the outer-side airtight shutter 8b which shuts off the flow between the indoor space 7a of the gas substituting chamber 3a and the outside is closed (closing step S1). Therefore, the honeycomb formed body 5 is accommodated in the indoor space 7a of the gas substituting chamber 3a, and due to the pair of airtight shutters 8a and 8b, the indoor space 7a is closed in a state in which the airtightness between the indoor space 7a and the furnace space 2a of the main firing furnace 2 and between the indoor space 7a and the outside is maintained. At this time, the indoor space 7a of the closed gas substituting chamber 3a is filled with the atmosphere A including oxygen, nitrogen, and the like, and is equal to the atmospheric pressure (1 atm).

Therefore, the atmosphere A existing in the indoor space 7a does not leak into the furnace space 2a of the main firing furnace 2 which is pre-filled with the argon gas 10. Similarly, the external atmosphere A does not leak into the indoor space 7a of the gas substituting chamber 3a.

After that, the pressure reduction portion 9 is controlled to reduce the pressure in the indoor space 7a of the gas substituting chamber 3a to a preset first vacuum pressure (pressure reducing step S2). Therefore, most of the atmosphere A is removed from the indoor space 7a which has been initially filled with the atmosphere A. In FIG. 2, in order to simplify the illustration, the atmosphere A still remaining in the indoor space 7a through the pressure reducing step S2 is shown in the lower part of the indoor space 7a and a pressure-reduced vacuum region V is shown in the upper part thereof in a divided manner. However, in actuality, the atmosphere A and the vacuum region V are diffused in the entire indoor space 7a.

Here, the first vacuum pressure is adjusted to the range of 0.1 to 5 kPa, and preferably the range of 2.0 to 4.3 kPa. Setting the value of the first vacuum pressure to be lower than 0.1 kPa is such that achievement with the pressure reduction portion 9 configured by using an existing vacuum pump or the like applies an excessive load and the pressure reduction time for reaching the first vacuum pressure is prolonged. On the other hand, when the value of the first vacuum pressure is higher than 5 kPa, the atmosphere A (oxygen) remaining at the time of the pressure reduction increases and the sufficient substitution of the argon gas 10 cannot be performed. Therefore, the first vacuum pressure is limited to the above range of the numerical values.

After the pressure reduction by the pressure reducing step S2 is completed and the indoor space is held for a predetermined time at the first vacuum pressure, the gas introduction portion 11 is controlled to introduce the argon gas 10 into the pressure-reduced indoor space 7a (pressure increasing step S3). At this time, the pressure in the indoor space 7a, into which the argon gas 10 is introduced by the gas introduction portion 11, is kept at a pressure increased to a second vacuum pressure, which is higher than the first vacuum pressure reduced by the pressure reducing step S2 and is lower than the atmospheric pressure before the pressure reduction. That is, the indoor space 7a is not subjected to 100% pressure recovery which is completely filled with the argon gas 10, but exhibits a pressure lower than the atmospheric pressure and is held at the second vacuum pressure which is a pressure higher than the first vacuum pressure by the argon gas 10 introduced into the indoor space 7a. Therefore, as illustrated in FIG. 2 (see the second figure from the bottom on the left side), the indoor space 7a after the pressure increasing step S3 is filled with three components of the vacuum region V, the argon gas 10, and the atmosphere A.

Here, the second vacuum pressure is adjusted to the range of 12 to 50 kPa, and preferably the range of 14 to 30 kPa. Here, when the value of the second vacuum pressure is lower than 12 kPa, it is difficult to obtain the effect of the substitution by the argon gas 10. On the other hand, when the value of the second vacuum pressure is higher than 50 kPa, the amount of the argon gas 10 used for pressure increase increases, making it difficult to reduce the total amount of the argon gas 10 used. Therefore, the second vacuum pressure is limited to the above range of the numerical values.

After the pressure increasing step S3, the pressure in the indoor space 7a is reduced to the first vacuum pressure again (pressure re-reducing step S4). Therefore, the proportion of the atmosphere A such as oxygen remaining in the indoor space 7a is further reduced. The pressure increasing step S3 and the pressure re-reducing step S4 are repeated at least twice, and more preferably four or more times (see FIG. 3). By repeating the pressure increasing step S3 and the pressure re-reducing step S4 a plurality of times, an oxygen concentration of oxygen remaining in the indoor space 7a is reduced. Therefore, the possibility that the atmosphere A remains in the indoor space 7a reaches close to 0%.

After that, the argon gas 10 is introduced into the indoor space 7a which is in a state of being reduced to the first vacuum pressure again, and the pressure in the indoor space 7a is recovered to the atmospheric pressure. Therefore, the indoor space 7a is brought into a state of 100% pressure recovery filled with inactive argon gas 10 (pressure recovering step S5). In this recovered pressure state, the furnace-side airtight shutter 8a is opened, and the main firing furnace 2 and the gas substituting chamber 3a are made to communicate with each other. After that, the honeycomb formed body 5 accommodated in the gas substituting chamber 3a is conveyed to the furnace space 2a of the main firing furnace 2 (conveying step S6).

Therefor, the indoor space 7a of the gas substituting chamber 3a is made to communicate with the furnace space 2a of the main firing furnace 2 filled with the argon gas 10 by opening the airtight shutter 8a in a state under the same atmosphere of the argon gas 10, and the honeycomb formed body 5 is conveyed from the gas substituting chamber 3a to the main firing furnace 2. As a result, oxygen, nitrogen, or the like existing in the atmosphere A does not penetrate into the furnace space 2a, and the quality of the main firing of the honeycomb formed body 5 is not largely affected by the presence of oxygen in particular. Therefore, it is possible to obtain the honeycomb structure 12 by firing the honeycomb formed body 5 under a stable firing condition.

In the substituting method 1 of the present embodiment, the value of the pressure (second vacuum pressure) in the indoor space 7a of the pressure increasing step S3, which is performed a plurality of times, may be adjusted so as to be always a constant vacuum pressure, or may be adjusted so that the vacuum pressure is gradually increased every time the pressure increase is performed, by performing adjustment so that the vacuum pressure is gradually increased, the proportion of the atmosphere A remaining in the indoor space 7a can be gradually increased, and the number of times of pressure increases can be reduced, or the load applied to the pressure reduction portion 9 such as a vacuum pump can be reduced. In addition, it is also possible to adjust each vacuum pressure and increase the number of times of pressure increases according to the deterioration in the sealing performance of the airtight shutters 8a and 8b or deterioration in the exhaust performance of the pressure reduction portion 9 such as a vacuum pump.

By the above process, the argon gas 10 can be introduced into the indoor space 7a by the pressure recovering step S5, and the oxygen concentration in the indoor space 7a before opening the airtight shutter 8a can be reduced to 500 ppm or less. When the oxygen concentration in the indoor space 7a is 500 ppm or less, there is no significant influence on the firing of the honeycomb formed body 5 even if the main firing step is performed using the main firing furnace 2.

Furthermore, in the substituting method 1 of the present embodiment, the pressure increase due to gas leakage between the indoor space 7a (closed space) of the gas substituting chamber 3a and the furnace space 2a or the outside can be limited to 1.0 Pa or less per second. That is, even when the airtightness between the indoor space 7a and the outside is held and the gap therebetween is closed by the pair of airtight shutters 8a, these closings are not perfect, and a small amount of gas may leak over time. Therefore, by making the amount of gas leakage less than or equal to the above value, the amount of the atmosphere A (oxygen) leaking into the indoor space 7a can be suppressed and kept below a specified oxygen concentration. As a result, there is no great influence on the firing of the honeycomb formed body 5.

Furthermore, since the first vacuum pressure is set to the range of 0.1 to kPa in the pressure reducing step S2 and the pressure re-reducing step S4, the vacuum pressure that can be sufficiently realized even when an existing vacuum pump is used. Therefore, no novel equipment such as a higher-performance vacuum pump is required, and the equipment cost can be suppressed.

Hereinafter, examples of the inert gas substituting method of the present invention will be described, but the inert gas substituting method of the present invention is not limited to these examples.

EXAMPLES (1) Relation Between Pressure and Elapsed Time

Figure 4:
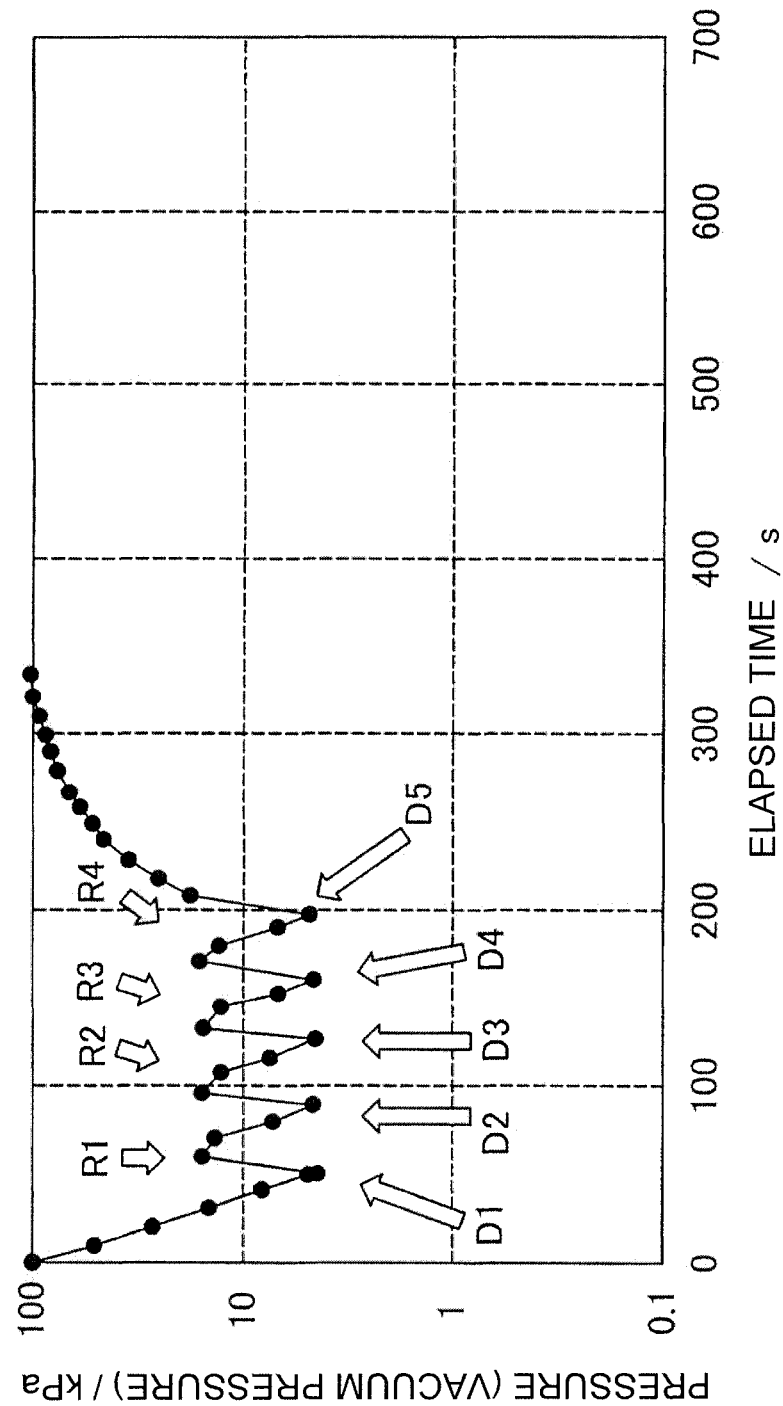
FIG. 4 is a graph showing a relationship between an atmospheric pressure (vacuum pressure) in an indoor space of a gas substituting chamber and elapsed time.
Figure 5:
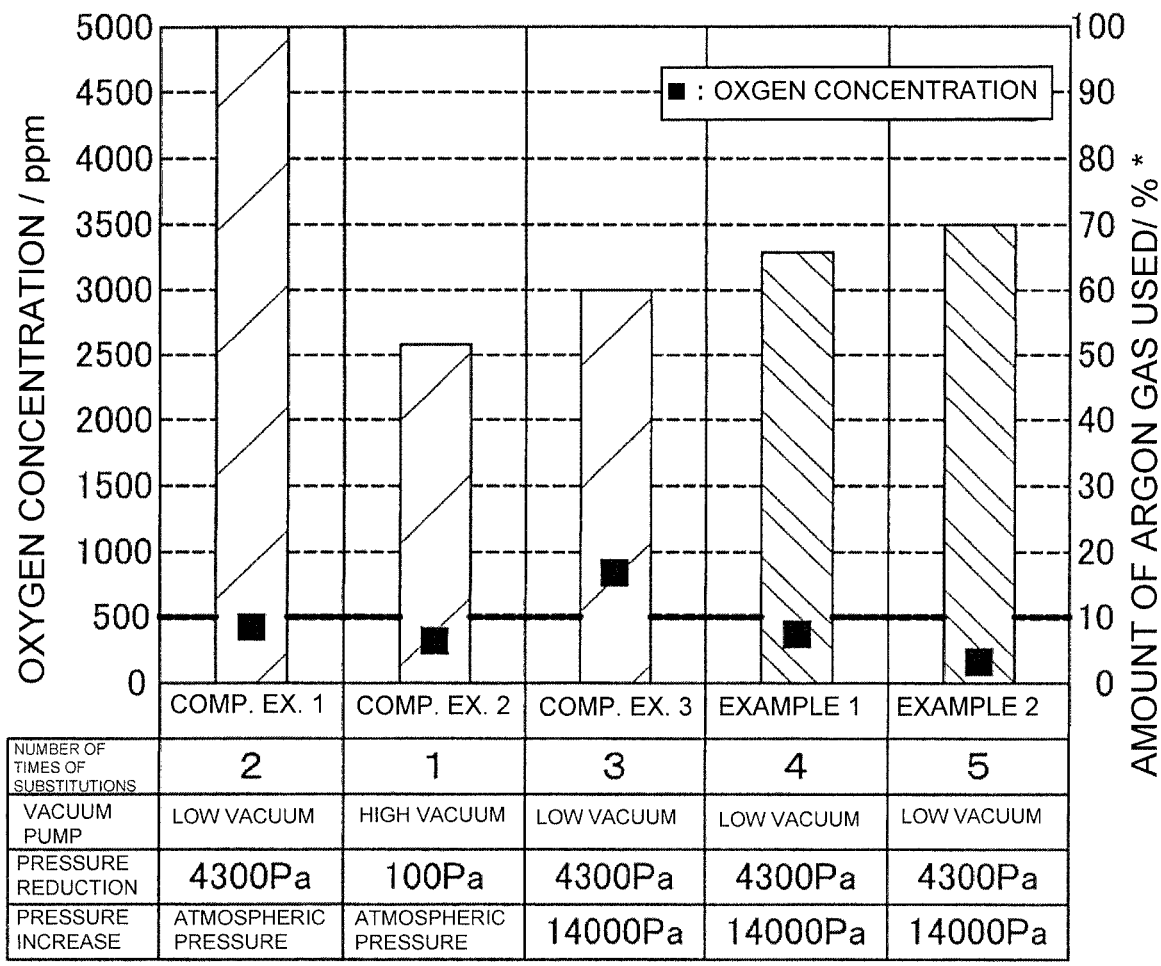
FIG. 5 is a graph showing a relationship between a value of an oxygen concentration and an amount of argon gas used with respect to the number of times of substitutions of argon gas.

FIG. 4 is a graph showing a relationship between a pressure (vacuum pressure) and elapsed time in a gas substituting chamber, in which pressure reduction and pressure increase are repeated, with respect to the gas substituting chamber (indoor volume=700 liters, pressure increase due to leakage=1.0 Pa in 1 second). According to this, it is confirmed that the vacuum pressure of the gas substituting chamber, which was initially the atmospheric pressure (≈101 kPa), is changed by repeating the pressure reduction D1-D5 and the pressure increase R1-R4 due to the introduction of argon gas. In particular, in the case of the substituting method of the present invention, it is not intended to recover the pressure to the atmospheric pressure, but the introduction of the argon gas is suppressed to the second vacuum pressure higher than the first vacuum pressure at the time of the pressure reduction and lower than the atmospheric pressure. Therefore, the amount of the argon gas used can be suppressed.

(2) Value of Oxygen Concentration with Respect to Number of Times of Substitutions of Argon Gas and Amount of Argon Gas Used In Example 1, the process of pressure reduction and pressure increase is repeated four times, and in Example 2, the process is repeated five times. At this time, the vacuum pressure (first vacuum pressure) at the time of the pressure reduction is all set to 4,300 Pa, and the vacuum pressure (second vacuum pressure) at the time of the pressure increase is all set to 14,000 Pa. On the other hand, as in the conventional inert gas substituting method, in Comparative Example 1, the process of the pressure reduction and 100% pressure recovery to the atmospheric pressure is repeated twice. In Comparative Example 2, a vacuum pump capable of reaching a high vacuum is used to reduce the pressure to 100 Pa at once, and then the pressure is recovered to 100%, to the atmospheric pressure. As in Example 1 and Example 2, Comparative Example 3 shows a process of reducing the pressure to 4,300 Pa and increasing the pressure to 14,000 Pa, which is repeated three times. The ratio of the amount of argon gas used represents the proportion on the assumption that the use amount of Comparative Example 1 is 100%.

According to this, as shown in Example 1 and Example 2, the amount of argon gas used can be greatly reduced, as compared with the conventional art, by increasing the pressure to the second vacuum pressure (14,000 Pa) without 100% pressure recovery from the reduced pressure state to the atmospheric pressure and repeating the process of the pressure reduction and the pressure increase. In addition, if the number of times of substitutions is four or five times, the oxygen concentration can also be suppressed to 500 ppm or less, which is defined in advance, and the main firing furnace does not hinder the firing of the honeycomb formed body.

On the other hand, as in the conventional case, Comparative Example 1 has a problem that the amount of argon gas used is remarkably increased and the manufacturing cost increases. On the other hand, Comparative Example 2 has an advantage that the amount of argon gas used is suppressed and the oxygen concentration is reduced. However, as described above, a vacuum pump capable of reaching a high vacuum needs to be prepared, a new capital investment is required, a filter member for collecting fine dust and the like in the indoor space is required, and the cost of the filter member and the burden required for replacement and inspection are increased.

On the other hand, as shown in Comparative Example 3, when the number of times of substitutions is three, it is possible to reduce the amount of argon gas used, but there is a possibility that will cause a problem in the firing of the honeycomb formed body since the oxygen concentration shows a specified value or more.

(3) In Case where 30% Reduction in Amount of Argon Gas Used is Aimed

Figure 6:
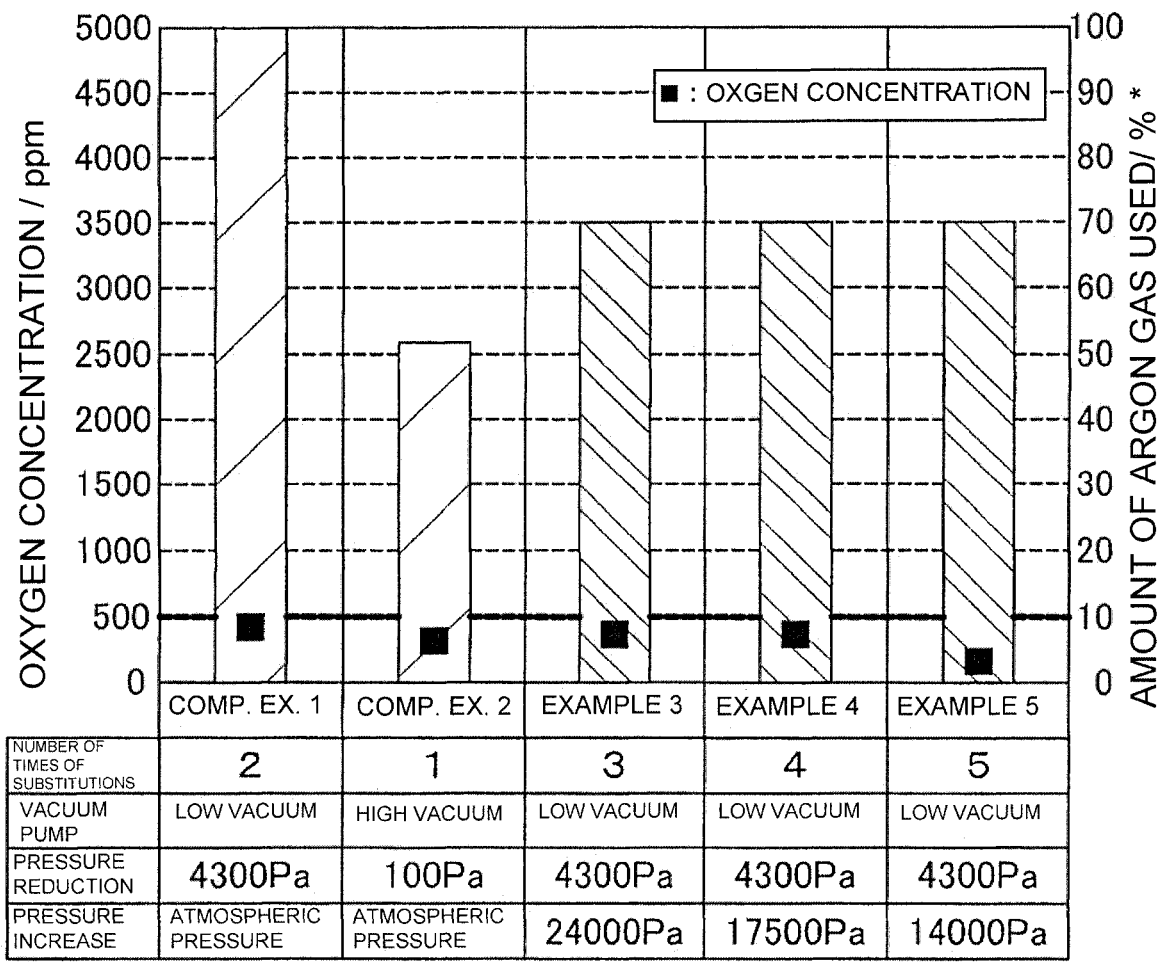
FIG. 6 is a graph showing a relationship between a value of an oxygen concentration and an amount of argon gas used with respect to the number of times of substitutions of argon gas when 30% reduction in the amount of argon gas used is aimed.

FIG. 6 shows the results of an experiment conducted on the assumption that the amount of argon gas used is reduced by 30%, as compared with the conventional art. Comparative Example 1 and Comparative Example 2 are the same as those illustrated in FIG. described above. On the other hand, Examples 3 to 5 are the processes of performing the pressure reduction and the pressure increase three times, four times, and five times, respectively. Here, the second vacuum pressure at the time of the pressure increase in Example 3 is 24,000 Pa, the second vacuum pressure at the time of the pressure increase in Example 4 is 17,500 Pa, and the second vacuum pressure at the time of the pressure increase in Example 5 is 14,000 Pa.

According to this, when the amount of argon gas used is reduced by 30%, at least the number of times of substitutions can be set to three times and the oxygen concentration can be suppressed to 500 ppm (Example 3). In this case, the second vacuum pressure at the time of the pressure increase needs to be increased to 24,000 Pa. On the other hand, when the number of times of substitutions is four times (Example 4) or five times (Example 5), the second vacuum pressure can be suppressed to 17,500 Pa or 14,000 Pa, respectively. Therefore, even if the number of times of substitutions increases, the total amount of argon gas used can be reduced by 30%, as compared with the conventional art (Comparative Example 1).

As described above, the inert gas substituting method of the present invention need not recover the pressure in the indoor space after the pressure reduction to the same level as the atmospheric pressure, and can reduce the amount of argon gas used by increasing the number of times of substitutions and suppressing the pressure increase to the second vacuum pressure. Therefore, according to the ceramic structure manufacturing method using the inert gas substituting method of the present invention, it is possible to perform the firing of the ceramic body such as the honeycomb formed body under the inert gas atmosphere, and it is possible to reduce the manufacturing cost when the ceramic structure such as the honeycomb structure is manufactured.

Furthermore, in the substituting method of the present embodiment, the example of substituting the inert gas (argon gas) in the gas substituting chamber installed on the upstream side (or the downstream side) of the main firing furnace has been described, but the present invention is not limited thereto. The entire furnace space of the single firing furnace may be substituted with inert gas. In addition, in the firing step of the substituting method and the manufacturing method, the example of firing the honeycomb formed body has been described, but the present invention is not limited thereto. Ceramic bodies having other shapes may be fired to obtain the ceramic structure. Furthermore, although the honeycomb formed body including silicon carbide as a main component is shown as an example of the non-oxide ceramic, the honeycomb formed body is not limited thereto. Other ceramic materials may be used.

INDUSTRIAL APPLICABILITY

The inert gas substituting method of the present invention is used in the firing step (main firing step) of firing the ceramic body such as the honeycomb formed body and is suitable for suppressing the use amount of inert gas such as argon gas. Furthermore, the ceramic structure manufacturing method of the present invention, which uses the inert gas substituting method, can be applied to the step of firing the ceramic body at the time of manufacturing the ceramic structure, and can suppress the manufacturing cost of the entire ceramic structure.

DESCRIPTION OF REFERENCE NUMERALS

1: substituting method (inert gas substituting method, ceramic structure manufacturing method), 2: main firing step, 2a: furnace space, 3a, 3b, 101: gas substituting chamber, 4: debinder furnace, 5: honeycomb formed body (ceramic body), 6a, 6b: furnace open end, 7a, 7b, 103: indoor space (closed space), 8a, 8b, 102a, 102b: airtight shutter, 9: pressure reduction portion, 10: argon gas (inert gas) 11: gas introduction portion, 12: honeycomb structure, 14: gas substituting chamber open end, 100: conventional inert gas substituting method, 104: inert gas, A: atmosphere, D1, D2, D3, D4, D5: pressure reduction, R1, R2, R3, R4: pressure increase, S1, S101: closing step, S2, S102: pressure reducing step, S3: pressure increasing step, S4: pressure re-reducing step, S5, S103: pressure recovering step, S6, S104: conveying step, and V: vacuum region.

The invention claimed is:
1. An inert gas substituting method comprising:
a closing step of accommodating a ceramic body in a closed space and closing the closed space with airtightness from outside being maintained;
a pressure reducing step of reducing a pressure in the closed space to a preset first vacuum pressure;
a pressure increasing step of introducing inert gas into the pressure-reduced closed space and increasing the pressure in the closed space to a second vacuum pressure which is higher than the first vacuum pressure and lower than atmospheric pressure;
a pressure re-reducing step of reducing the pressure in the pressure-increased closed space to the first vacuum pressure again; and
a pressure recovering step of repeating the pressure increasing step and the pressure re-reducing step at least twice, introducing the inert gas into the closed space in which the pressure has been reduced to the first vacuum pressure again, and recovering the pressure in the closed space to atmospheric pressure.

2. The inert gas substituting method according to claim 1, wherein the pressure increasing step and the pressure re-reducing step are repeated four times.

3. The inert gas substituting method according to claim 1, wherein the closed space is an indoor space of a gas substituting chamber connected to a furnace open end of at least one of an upstream side and a downstream side of a firing furnace which fires the ceramic body, and
an airtight shutter capable of closing the closed space and a furnace space of the firing furnace while maintaining airtightness is installed between the gas substituting chamber and the furnace open end of the firing furnace.

4. The inert gas substituting method according to claim 1, wherein the closed space is a furnace space of a firing furnace which fires the ceramic body, and
an airtight shutter is installed in a furnace open end of the firing furnace.

5. The inert gas substituting method according to claim 1, wherein the second vacuum pressure is adjusted so that the second vacuum pressure becomes constant in each of the pressure increasing steps repeated at least twice, or the second vacuum pressure is adjusted so that the second vacuum pressure is increased every time the pressure increasing step is performed.

6. The inert gas substituting method according to claim 1, wherein argon gas is used as the inert gas.

7. The inert gas substituting method according to claim 1, wherein the ceramic body is a honeycomb formed body having a lattice-shaped partition wall which partitions and forms a plurality of cells extending from one end surface to an other end surface and a circumferential wall.

8. The inert gas substituting method according to claim 1, wherein an oxygen concentration in the closed space recovered to the atmospheric pressure by the pressure recovering step is 500 ppm or less.

9. The inert gas substituting method according to claim 1, wherein the first vacuum pressure is adjusted to the range of 0.1 to 5 kPa, and
the second vacuum pressure is adjusted to the range of 12 to 50 kPa.

10. The inert gas substituting method according to claim 1, wherein a pressure increase due to leakage in the closed space is 1.0 Pa or less in 1 second.

11. A ceramic structure manufacturing method using an inert gas substituting method, comprising:
a molding step of forming a ceramic body from a molding material; and
a firing step of firing the ceramic body obtained by the molding step to form a ceramic structure;
wherein the firing step comprises:
a closing step of accommodating the ceramic body in a closed space and closing the closed space with airtightness from outside being maintained;
a pressure reducing step of reducing a pressure in the closed space to a preset first vacuum pressure;
a pressure increasing step of introducing inert gas into the pressure-reduced closed space and increasing the pressure in the closed space to a second vacuum pressure which is higher than the first vacuum pressure and lower than atmospheric pressure;
a pressure re-reducing step of reducing the pressure in the pressure-increased closed space to the first vacuum pressure again; and
a pressure recovering step of repeating the pressure increasing step and the pressure re-reducing step at least twice, introducing the inert gas into the closed space in which the pressure has been reduced to the first vacuum pressure again, and recovering the pressure in the closed space to atmospheric pressure.

12. The ceramic structure manufacturing method using the inert gas substituting method according to claim 11, wherein the inert gas substituting method in the firing step repeats the pressure increasing step and the pressure re-reducing step four times.

13. The ceramic structure manufacturing method using the inert gas substituting method according to claim 11, wherein the inert gas substituting method in the firing step adjusts the second vacuum pressure so that the second vacuum pressure becomes constant in each of the pressure increasing steps repeated at least twice, or adjusts the second vacuum pressure so that the second vacuum pressure is increased whenever the pressure increasing step is performed.

14. The ceramic structure manufacturing method using the inert gas substituting method according to claim 11, wherein the ceramic body is a honeycomb formed body having a lattice-shaped partition wall which partitions and forms a plurality of cells extending from one end surface to an other end surface and a circumferential wall.

15. The ceramic structure manufacturing method using the inert gas substituting method according to claim 14, wherein the ceramic body comprises silicon carbide as a main component.

* * * * *

UNITED STATES PATENT AND TRADEMARK OFFICE
CERTIFICATE OF CORRECTION

| | |
|---|---|
| PATENT NO. | : 10,774,009 B2 |
| APPLICATION NO. | : 15/969052 |
| DATED | : September 15, 2020 |
| INVENTOR(S) | : Chikashi Ihara, Takashi Goshima and Yoshiyuki Kamei |

Page 1 of 1

It is certified that error appears in the above-identified patent and that said Letters Patent is hereby corrected as shown below:

On the Title Page

Item (73)
Please change: "Assignee: NGK Insulatros, Ltd., Nagoya (JP)" to -- Assignee: NGK Insulators, Ltd., Nagoya (JP) --

Signed and Sealed this
Thirteenth Day of October, 2020

Andrei Iancu
*Director of the United States Patent and Trademark Office*